United States Patent
Nakabayashi (10) Patent No.: US 7,293,124 B2
(45) Date of Patent: Nov. 6, 2007

(54) STORAGE DEVICE WITH PARALLEL INTERFACE CONNECTOR

(75) Inventor: Yoichi Nakabayashi, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 453 days.

(21) Appl. No.: 11/088,824

(22) Filed: Mar. 25, 2005

(65) Prior Publication Data

US 2005/0268007 A1    Dec. 1, 2005

(30) Foreign Application Priority Data

May 31, 2004  (JP) ............................... 2004-161418

(51) Int. Cl.
   *G06F 13/12*  (2006.01)
   *G06F 13/00*  (2006.01)

(52) U.S. Cl. ........................ 710/71; 710/14; 710/305

(58) Field of Classification Search .............. 710/8–14, 710/22, 36–38, 62–74, 305–317; 709/250
See application file for complete search history.

(56) References Cited

U.S. PATENT DOCUMENTS

| | | | |
|---|---|---|---|
| 4,914,688 A * | 4/1990 | Kobayashi et al. | 379/93.29 |
| 5,867,496 A | 2/1999 | Peres et al. | |
| 6,753,903 B1 * | 6/2004 | Lin | 348/207.2 |
| 6,792,494 B2 * | 9/2004 | Bennett et al. | 710/302 |
| 7,231,485 B2 * | 6/2007 | Harris et al. | 710/315 |
| 7,246,192 B1 * | 7/2007 | Chang | 710/311 |
| 2002/0081873 A1 | 6/2002 | Harris et al. | |
| 2003/0005188 A1 * | 1/2003 | Tehrani et al. | 710/15 |
| 2003/0074515 A1 | 4/2003 | Resnick | |
| 2005/0235078 A1 * | 10/2005 | Bennett et al. | 710/71 |

FOREIGN PATENT DOCUMENTS

| | | |
|---|---|---|
| CN | 1424638 | 6/2003 |
| JP | 06-067774 A | 3/1994 |
| JP | 2001-256723 A | 9/2001 |
| JP | 3093782 U | 2/2003 |

OTHER PUBLICATIONS

Austrian Search Report dated Oct. 30, 2006 for Appln. No. 200502190-2.

* cited by examiner

*Primary Examiner*—Christopher Shin
(74) *Attorney, Agent, or Firm*—Pillsbury Winthrop Shaw Pittman, LLP (57) ABSTRACT

A mode designation device designates a serial interface mode or a parallel interface mode. A parallel/serial bridge circuit is operable in a serial interface mode, and converts, into a serial interface signal, a parallel interface signal transferred via a parallel interface bus. The resultant signal is transmitted to a serial interface bus. The serial interface bus is connected to particular pins that are included in the parallel interface connector and are not used by a parallel interface. The parallel/serial bridge circuit further converts, into a parallel interface signal, a serial interface signal transferred via the serial interface bus. The resultant signal is transmitted to the parallel interface bus.

11 Claims, 7 Drawing Sheets

F I G. 1

| Pin number | Signal name | Pin number | Signal name |
|---|---|---|---|
| 1 | -RESET | 2 | GROUND |
| 3 | DD 7 | 4 | DD 8 |
| 5 | DD 6 | 6 | DD 9 |
| 7 | DD 5 | 8 | DD 10 |
| 9 | DD 4 | 10 | DD 11 |
| 11 | DD 3 | 12 | DD 12 |
| 13 | DD 2 | 14 | DD 13 |
| 15 | DD 1 | 16 | DD 14 |
| 17 | DD 0 | 18 | DD 15 |
| 19 | GROUND | 20 | KEY |
| 21 | DMARQ | 22 | GROUND |
| 23 | -DIOW STOP | 24 | GROUND |
| 25 | -DIOR -DMARDY HSTROBE | 26 | GROUND |
| 27 | IORDY -DMARDY -DSTROBE | 28 | CSEL |
| 29 | -DMACK | 30 | GROUND |
| 31 | INTRQ | 32 | -IOCS 16 |
| 33 | DA 1 | 34 | -PDIAG/-CBLID |
| 35 | DA 0 | 36 | DA 2 |
| 37 | -CS 0 | 38 | -CS 1 |
| 39 | -DASP | 40 | GROUND |
| 41 | +5V | 42 | +5V |
| 43 | GROUND | 44 | RESERVED |

FIG. 2

| Pin number | Signal mame |
|---|---|
| 1 | GROUND |
| 2 | R+ |
| 3 | R- |
| 4 | GROUND |
| 5 | T+ |
| 6 | T- |
| 7 | GROUND |

FIG. 3

| Pin number | Signal mame |
|---|---|
| 1 | +3.3V |
| 2 | +3.3V |
| 3 | +3.3V |
| 4 | GROUND |
| 5 | GROUND |
| 6 | GROUND |
| 7 | +5V |
| 8 | +5V |
| 9 | +5V |
| 10 | GROUND |
| 11 | RESERVED |
| 12 | GROUND |
| 13 | +12V |
| 14 | +12V |
| 15 | +12V |

FIG. 4

| Pin number of PATA connector | Pin number of SATA connector | SATA- interface signal name | Pin number of PATA connector | Pin number of SATA connector | SATA- interface signal name |
|---|---|---|---|---|---|
| 1 | | | 2 | | |
| 3 | | | 4 | | |
| 5 | | | 6 | | |
| 7 | | | 8 | | |
| 9 | | | 10 | | |
| 11 | | | 12 | | |
| 13 | | | 14 | | |
| 15 | | | 16 | | |
| 17 | | | 18 | | |
| 19 | 1,4,7 | GROUND | 20 | | |
| 21 | | | 22 | 2 | R+ |
| 23 | | | 24 | 3 | R− |
| 25 | | | 26 | 5 | T+ |
| 27 | | | 28 | | |
| 29 | | | 30 | 6 | T− |
| 31 | | | 32 | | |
| 33 | | | 34 | | |
| 35 | | | 36 | | |
| 37 | | | 38 | | |
| 39 | | | 40 | | |
| 41 | | | 42 | | |
| 43 | | | 44 | | |

FIG. 5

| Pin number of PATA connector | Pin number of power connector | SATA-interface signal name | Pin number of PATA connector | Pin number of power connector | SATA-interface signal name |
|---|---|---|---|---|---|
| 1 | | | 2 | | |
| 3 | | | 4 | | |
| 5 | | | 6 | | |
| 7 | | | 8 | | |
| 9 | | | 10 | | |
| 11 | | | 12 | | |
| 13 | | | 14 | | |
| 15 | | | 16 | | |
| 17 | | | 18 | | |
| 19 | | | 20 | | |
| 21 | | | 22 | | |
| 23 | | | 24 | | |
| 25 | | | 26 | | |
| 27 | | | 28 | | |
| 29 | | | 30 | | |
| 31 | | | 32 | | |
| 33 | | | 34 | | |
| 35 | | | 36 | | |
| 37 | | | 38 | | |
| 39 | | | 40 | 4,5,6 | GROUND |
| 41 | 7 | +5V | 42 | 8,9 | +5V |
| 43 | 10,12 | GROUND | 44 | | |

STORAGE DEVICE WITH PARALLEL INTERFACE CONNECTOR

CROSS-REFERENCE TO RELATED APPLICATIONS

This application is based upon and claims the benefit of priority from prior Japanese Patent Application No. 2004-161418, filed May 31, 2004, the entire contents of which are incorporated herein by reference.

BACKGROUND OF THE INVENTION

1. Field of the Invention

The present invention relates to a storage device with a parallel interface connector, and more particularly to a storage device compatible with both parallel and serial interfaces.

2. Description of the Related Art

Standards for serial AT Attachment (ATA) interfaces have recently been drawn up. Like conventional ATA interfaces (i.e., parallel ATA interfaces), serial ATA interfaces are used between host systems and peripheral devices represented by such storage devices as hard disk drives. Conventional storage devices are suitable only for one kind of ATA interface—either parallel or serial. Therefore, some storage devices may not be connectable to certain host systems.

Utility Model No. 3093782 discloses a technique (hereinafter referred to as "the prior art") related to a system (interface connector) for connecting a storage device to a host system. The prior art enables any storage device to be connected to any host system, regardless of whether the device is designed for a parallel ATA interface (parallel interface) or a serial ATA interface (serial interface). In this case, however, the host system must be compatible with both parallel and serial ATA interfaces. In other words, storage devices suitable only for parallel ATA interfaces cannot be connected to host systems suitable only for serial ATA interfaces. Similarly, storage devices suitable only for serial ATA interfaces cannot be connected to host systems suitable only for parallel ATA interfaces.

BRIEF SUMMARY OF THE INVENTION

In accordance with an embodiment of the invention, there is provided a storage device with a parallel interface connector connectable to a host system suitable for a parallel interface. The parallel interface connector includes first pins connected to a parallel interface bus, and second pins which are not used by the parallel interface. The parallel interface bus is connected to a parallel interface circuit for inputting and outputting a parallel interface signal. The storage device comprises a mode designation device, serial interface bus and parallel/serial bridge circuit. The mode designation device designates one of a serial interface mode and a parallel interface mode, the serial interface mode enabling the storage device to operate in accordance with a serial interface, the parallel interface mode enabling the storage device to operate in accordance with the parallel interface. The serial interface bus is used to transfer a serial interface signal, and connected to several pins included in the second pins of the parallel interface connector. The parallel/serial bridge circuit is connected to the parallel interface bus and the serial interface bus. The bridge circuit is configured to convert, into a serial interface signal, a parallel interface signal transferred via the parallel interface bus, and to output the serial interface signal to the serial interface bus. The parallel/serial bridge circuit is also configured to convert, into a parallel interface signal, a serial interface signal transferred via the serial interface bus, and to output the parallel interface signal to the parallel interface bus. The parallel/serial bridge circuit is operable in the serial interface mode.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
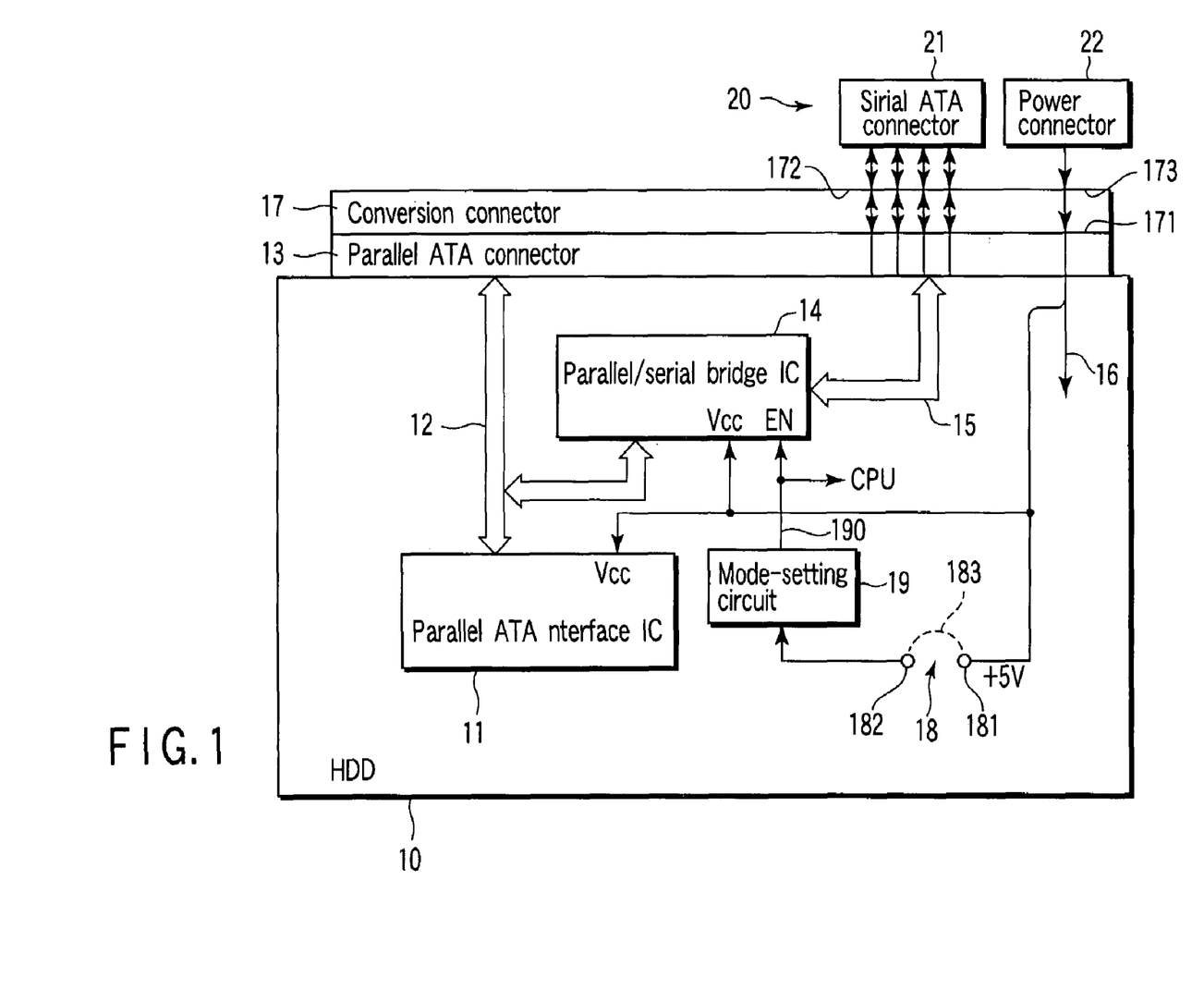
FIG. 1 is a block diagram illustrating the configuration of a hard disk drive (HDD), according to an embodiment of the invention, in relation to the interface between the hard disk drive and a host system.

An embodiment, in which a storage device according to the invention is applied to a hard disk drive, will be described in detail with reference to the accompanying drawings. FIG. 1 is a block diagram illustrating the configuration of a hard disk drive (HDD) 10, according to an embodiment of the invention, in relation to the interface of a host system 20. In FIG. 1, it is assumed that the host system 20 is suitable only for a serial ATA interface (SATA interface). Accordingly, the host system 20 comprises a serial ATA interface 21 and power connector 22. It is also assumed that the serial ATA connector 21 and power connector 22 are secured to the printed circuit board of the host system 20. However, the serial ATA connector 21 and power connector 22 may be connectors to be connected to a serial ATA interface cable and power cable connected to the main unit of the host system 20.

The HDD 10 is of, for example, a 2.5-inch type. The HDD 10 comprises a parallel ATA interface IC 11, parallel ATA bus 12, parallel ATA connector 13 and parallel/serial bridge IC 14. The HDD 10 further comprises a serial ATA bus 15, power line 16, conversion connector 17, jumper switch 18 and mode-setting circuit 19.

The parallel ATA interface IC 11 is an interface circuit formed of a single chip. The parallel ATA interface IC 11 communicates with the host system 20 in accordance with the protocol for PATA interfaces if the host system 20 is designed for parallel ATA interfaces (PARA interfaces), unlike the case of FIG. 1. However, the parallel ATA interface IC 11 is operable even if the host system 20 is designed for serial ATA interfaces (SATA interfaces) as in the case of FIG. 1. The parallel ATA interface IC 11 is connected to the pins (first pins) of the parallel ATA connector 13 via the parallel ATA bus 12.

Figure 2:
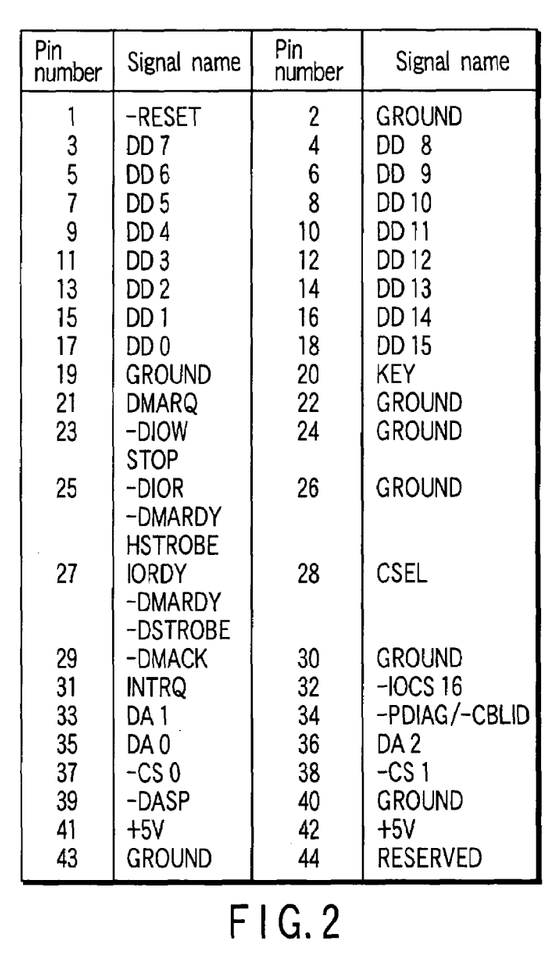
FIG. 2 is a view illustrating the relationship between each pin of the parallel ATA connector 13 appearing in FIG. 1 and a signal assigned to each pin.

The parallel ATA connector 13 is formed of a 2.5-inch HDD connector in the embodiment that employs a 2.5-inch HDD 10. Further, this connector is a 50-pin connector having 50 connector pins arranged in upper and lower stages (25 pins in each stage). FIG. 2 shows the relationship between each of the pins (the pins with pin numbers 1-43, i.e., the first to 43$^{rd}$ pins) and a signal assigned thereto. In FIG. 2, "−" attached to some signal names indicates that the signals are used in the form of negative logic. The parallel ATA bus 12 includes signal lines used to transfer signals (parallel ATA interface signals), except for power signals, which are included in the signals assigned to the pins of the parallel ATA connector 13. Assuming that the host system is suitable for parallel ATA interfaces, to connect the HDD 10 to the host system 20, it is sufficient if the parallel ATA connector 13 of the HDD 10 is connected to the parallel ATA connector (not shown) of the host system 20.

The parallel/serial bridge IC 14 is operable only if the host system 20 is suitable for parallel ATA interfaces. The parallel/serial bridge IC 14 is connected to the parallel ATA interface IC 11 via the parallel ATA bus 12, and connected to several of the particular pins (second pins) of the parallel ATA connector 13 via the serial ATA bus 15. The particular pins (second pins) are extra pins for the parallel ATA interface, i.e., they are not used by the parallel ATA interface. Specifically, in the embodiment, the particular pins are seven pins included in eight pins (with pin numbers of 2, 19, 22, 24, 26, 30, 40 and 43) assigned as ground (GND) pins in the parallel ATA interface. The above-mentioned several pins included in the particular pins will be described later in detail.

The parallel/serial bridge IC 14 has a parallel-to-serial conversion function for converting a signal from the parallel ATA bus 12 (parallel ATA interface signal) into a signal for the serial ATA bus 15 (serial ATA interface signal). The parallel/serial bridge IC 14 also has a serial-to-parallel conversion function for converting a signal from the serial ATA bus 15 into a signal for the parallel ATA bus 12. A single-chip IC may be used instead of the parallel/serial bridge IC 14 and parallel ATA interface IC 11. In this case, however, it is necessary to enable the function of the parallel/serial bridge IC to be selected independent of the function of the parallel ATA interface IC.

The serial ATA bus 15 includes signal lines (not shown) for signal transfer assigned to the signal pins (four signal pins in the embodiment) of the serial ATA connector 21. More specifically, the serial ATA bus 15 includes a pair of signal lines for transferring a pair of received serial ATA interface signals R+ and R−, and a pair of signal lines for transferring a pair of transmission serial ATA interface signals T+ and T−. The power line 16 includes, for example, two +5V-lines and a single ground (GND) line.

The conversion connector 17 is used to connect the HDD 10 to the host system 20 when the host system 20 is suitable for serial ATA interfaces as in the case of FIG. 1. The conversion connector 17 has a connector section 171 that can be connected to the parallel ATA connector 13, and connector sections 172 and 173 that can be connected to the serial ATA connector 21 and power connector 22 of a host system (host system 20 in the embodiment) suitable for serial ATA interfaces. In the example of FIG. 1 in which the host system 20 is suitable for serial ATA interfaces, the parallel ATA connector 13 is connected to the connector section 171 of the conversion connector 17. Further, the connector section 172 of the conversion connector 17 is connected to the serial ATA connector 21 of the host system 20, and the connection section 173 of the connector 17 is connected to the power connector 22 of the host system 20.

The jumper switch 18 is used as a mode switch (mode designation device) for designating the operation mode of the HDD 10. The operation mode of the HDD 10 includes a serial ATA interface mode and parallel ATA interface mode. The serial ATA interface mode enables the HDD 10 to function as a device suitable for serial ATA interfaces, while the parallel ATA interface mode enables the HDD 10 to function as a device suitable for parallel ATA interfaces. The jumper switch 18 has a pair of terminals 181 and 182. +5V is applied from the power line 16 to the terminal 181. The terminal 182 is connected to the mode-setting circuit 19.

In accordance with the state (mode designation state) of the jumper switch 18, the mode-setting circuit 19 outputs mode signal 190 of the high or low level for setting the HDD 10 in the serial or parallel ATA interface mode. The mode-setting circuit 19 outputs mode signal 190 of the high level while +5V is applied thereto via the jumper switch 18 having the terminals 181 and 182 short-circuited by a jumper line 183. On the other hand, when +5V is not applied thereto with the terminals 181 and 182 disconnected, the mode-setting circuit 19 outputs mode signal 190 of the low level. Mode signal 190 is supplied to the enable terminal EN of the parallel/serial bridge IC 14.

Figure 3:
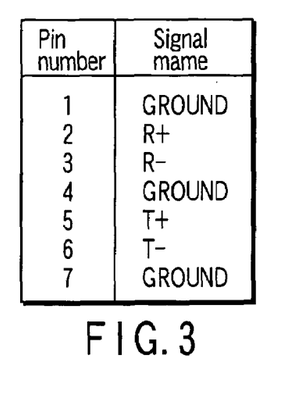
FIG. 3 is a view illustrating the relationship between each pin of the serial ATA connector 21 appearing in FIG. 1 and a signal assigned to each pin.

FIG. 3 shows the relationship between each pin of the serial ATA connector 21 and a signal assigned to each pin. As shown in FIG. 3, received serial ATA interface signals R+ and R− are assigned to pins with numbers 2 and 3, respectively. Further, transmission serial ATA interface signals T+ and T− are assigned to pins with numbers 5 and 6, respectively. In FIG. 3, signal names that are recognized by the HDD 10 are used. As apparent, the host system 20 recognizes that serial ATA interface signals T+ and T− are assigned to the pins with numbers 2 and 3, respectively, and received serial ATA interface signals R+ and R− are assigned to the pins with numbers 5 and 6, respectively. As mentioned above, the embodiment uses the signal names recognized by the HDD 10.

Figure 4:
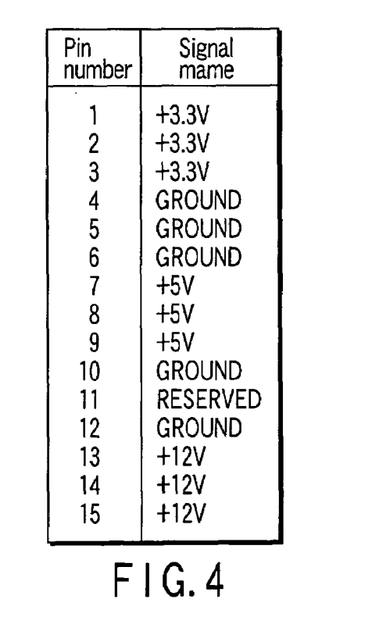
FIG. 4 is a view illustrating the relationship between each pin of the power connector 22 appearing in FIG. 1 and a signal assigned to each pin.

FIG. 4 shows the relationship between each pin of the power connector 22 and a signal assigned to each pin. As shown in FIG. 4, the specifications of power connectors for serial ATA interfaces define three power supplies of +3.3V, +5V and +12V. However, in the embodiment in which the HDD 10 is of a 2.5-inch type, only the power supply of +5V is utilized.

Figure 5:
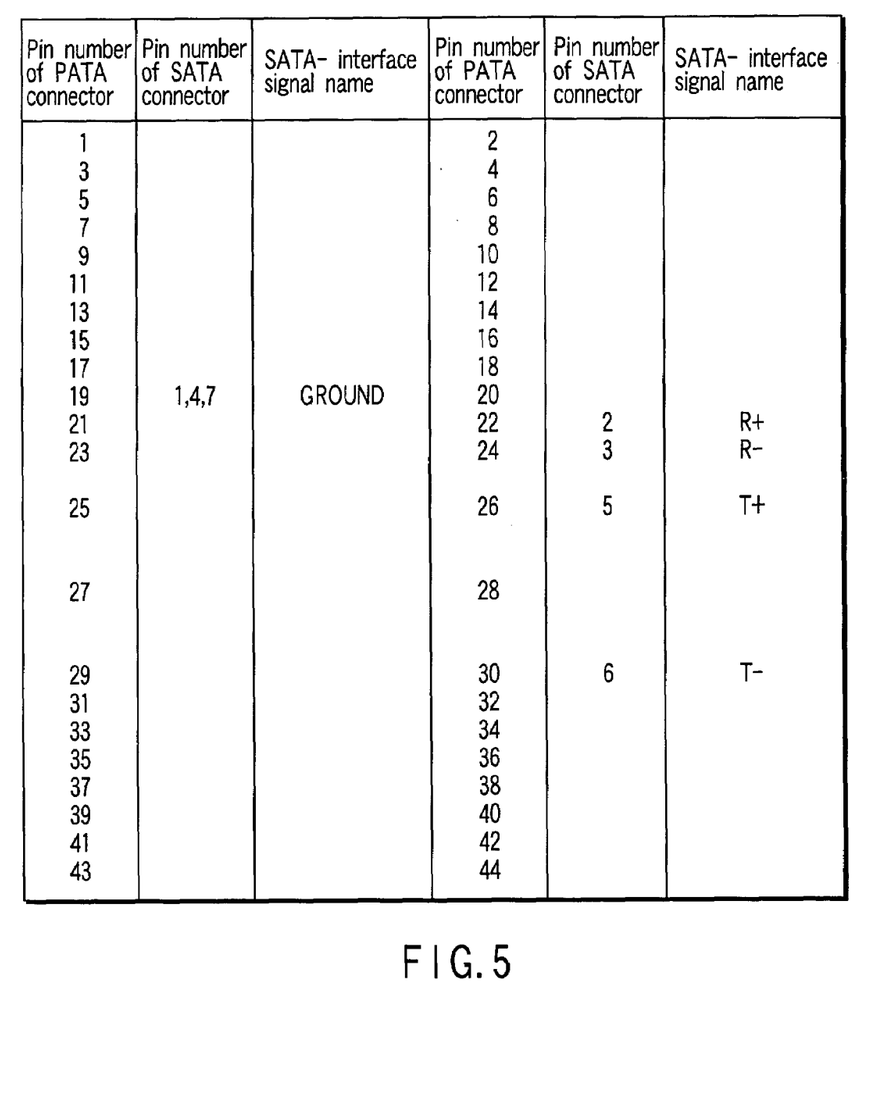
FIG. 5 is a view illustrating a relationship example between each pin of the parallel ATA connector 13, each pin of the serial ATA connector 21 and a signal assigned to each pin of the serial ATA connector 21.

FIG. 5 shows a relationship example between each pin of the parallel ATA connector 13 connected to the connector section 171 of the conversion connector 17, each pin of the serial ATA connector 21 connected to the connector section 172 of the connector 17, and a signal assigned to each pin of the serial ATA connector 21. As shown in FIG. 5, in the embodiment, a pin with number 19 in the parallel ATA connector 13, i.e., the 19$^{th}$ pin for signal GROUND (see FIG. 2), is made by the conversion connector 17 to correspond to pins with numbers 1, 4 and 7 in the serial ATA connector 21, i.e., the first, fourth and seventh pins for signal GROUND (see FIG. 3). Further, pins with numbers 22 and 24 in the parallel ATA connector 13, i.e., the 22$^{nd}$ and 24$^{th}$ pins for signal GROUND (see FIG. 2), are made by the conversion connector 17 to correspond to pins with numbers 2 and 3 in the serial ATA connector 21, i.e., the second and third pins for received serial ATA interface signals R+ and R− (see FIG. 3). Similarly, pins with numbers 26 and 30 in the parallel ATA connector 13, i.e., the 26$^{th}$ and 30$^{th}$ pins for signal GROUND (see FIG. 2), are made by the conversion connector 17 to correspond to pins with numbers 5 and 6 in the serial ATA connector 21, i.e., the fifth and sixth pins for transmission serial ATA interface signals T+ and T− (see FIG. 3).

The relationship shown in FIG. 5 is just an example. In other words, the combinations between the first to seventh pins of the serial ATA connector 21 and the 19$^{th}$, 22$^{nd}$, 24$^{th}$, 26$^{th}$ and 30$^{th}$ pins of the parallel ATA connector 13 are arbitrary ones. Furthermore, the first to seventh pins of the serial ATA connector 21 are not always made to correspond to the 19$^{th}$, 22$^{nd}$, 24$^{th}$, 26$^{th}$ and 30$^{th}$ pins of the parallel ATA connector 13. It is sufficient if the pins of the parallel ATA connector 13, which are not used when the HDD 10 is operated in the parallel ATA interface mode, are made to correspond to the first to seventh pins of the connector 21.

Figure 6:
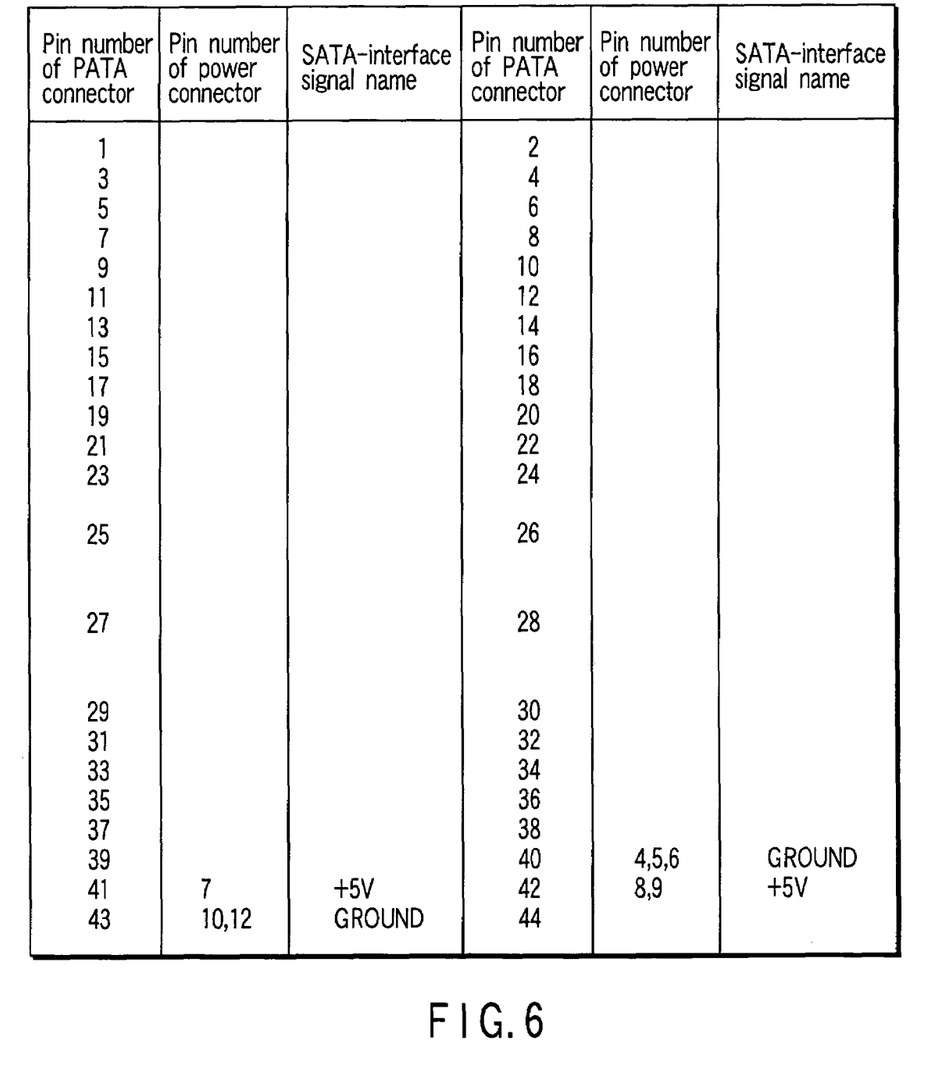
FIG. 6 is a view illustrating a relationship example between each pin of the parallel ATA connector 13, each pin of the power connector 22 and a signal assigned to each pin of the power connector 22.

FIG. 6 shows a relationship example between each pin of the parallel ATA connector 13 connected to the connector section 171 of the conversion connector 17, each pin of the power connector 22 connected to the connector section 173 of the conversion connector 17, and a signal assigned to each pin of the power connector 22. As shown in FIG. 6, in the embodiment, a pin with number 40 in the parallel ATA connector 13, i.e., the 40$^{th}$ pin for signal GROUND (see FIG. 2), is made by the conversion connector 17 to correspond to pins with numbers 4, 5 and 6 in the power connector 22, i.e., the fourth, fifth and seventh pins for signal GROUND (see FIG. 4). Further, a pin with number 41 in the parallel ATA connector 13, i.e., the 41$^{st}$ pin for signal +5V (see FIG. 2), is made by the conversion connector 17 to correspond to a pin with number 7 in the power connector 22, i.e., the seventh pin for signal +5V (see FIG. 4). Similarly, a pin with number 42 in the parallel ATA connector 13, i.e., the 42$^{nd}$ pin for signal +5V (see FIG. 2), is made by the conversion connector 17 to correspond to pins with numbers 8 and 9 in the power connector 22, i.e., the eighth and ninth pins for signal +5V (see FIG. 4). A pin with number 43 in the parallel ATA connector 13, i.e., the 43$^{rd}$ pin for signal GROUND (see FIG. 2), is made by the conversion connector 17 to correspond to pins with numbers 10 and 12 in the power connector 22, i.e., the tenth and twelfth pins for signal GROUND (see FIG. 4). Thus, concerning the power supply, the parallel ATA connector 13 is commonly used by the parallel ATA interface and serial ATA interface.

Figure 7:
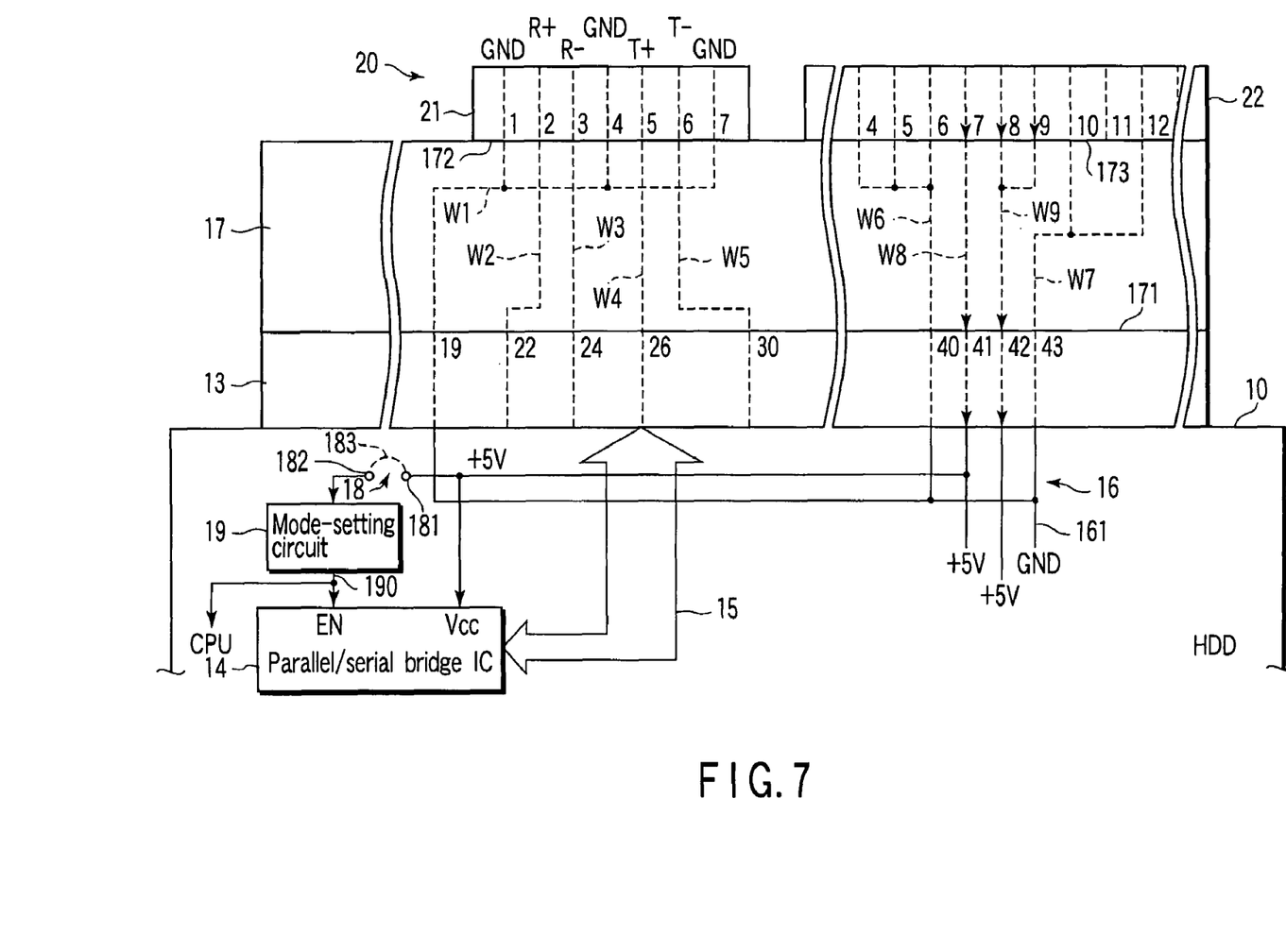
FIG. 7 is a view illustrating in detail the relationship in connection between the serial ATA connector 21, power connector 22, conversion connector 17 appearing in FIG. 1, and parallel ATA connector 13.

FIG. 7 illustrates in detail the relationship in connection between the serial ATA connector 21, power connector 22, conversion connector 17 and parallel ATA connector 13. In FIG. 7, the parallel ATA connector 13 of the HDD 10 is connected to the connector section 171 of the conversion connector 17. Further, the connector section 172 of the conversion connector 17 is connected to the serial ATA connector 21 of the host system 20, and the connector section 173 of the conversion connector 17 is connected to the power connector 22 of the host system 20.

In this state, the ground pins with numbers 1, 4 and 7 in the serial ATA connector 21 are connected to the ground pin with number 19 in the parallel ATA connector 13 by an internal wire W1 of the conversion connector 17. Further, the received serial ATA interface signal pins with numbers 2 and 3 in the serial ATA connector 21 are connected to the ground pins with numbers 22 and 24 in the parallel ATA connector 13 by internal wires W2 and W3 of the connector 17, respectively. Similarly, the transmission serial ATA interface signal pins with numbers 5 and 6 in the serial ATA connector 21 are connected to the ground pins with numbers 26 and 30 in the parallel ATA connector 13 by internal wires W4 and W5 of the connector 17, respectively. In the HDD 10, it is not always necessary to use all the eight ground pins of the parallel ATA connector 13. In the HDD 10 of the embodiment, only the ground pin with number 19, and the ground pins with numbers 40 and 43, described later, are used as ground pins. Accordingly, when the HDD 10 is operated in the serial ATA interface mode, even if the ground pins with numbers 22, 24, 26 and 30 in the parallel ATA connector 13 are assigned to a signal other than signal GROUND, no problem will occur.

The ground pins with numbers 4, 5 and 6 in the power connector 22 are connected by an internal wire W6 of the conversion connector 17 to the ground pin with number 40 Of the parallel ATA connector 13. Further, the ground pins with numbers 10 and 12 in the power connector 22 are connected by an internal wire W7 of the conversion connector 17 to the ground pin with number 43 in the parallel ATA connector 13. The +5V pin with number 7 in the power connector 22 is connected to the +5V pin with number 41 in the parallel ATA connector 13 by an internal wire W8 of the conversion connector 17. Similarly, the +5V pins with numbers 8 and 9 in the power connector 22 are connected to the +5V pin with number 42 in the parallel ATA connector 13 by an internal wire W9 of the conversion connector 17. That is, the 40$^{th}$ to 43$^{rd}$ pins (third pins) of the parallel ATA connector 13 are commonly used as power pins between the serial ATA interface and parallel ATA interface.

In the HDD 10, the pins with numbers 19, 40 and 43 in the parallel ATA connector 13 are commonly connected to a ground line 161. The ground line 161 is included in the power line 16. Further, in the HDD 10, the pins with numbers 22, 24, 26 and 30 in the parallel ATA connector 13 are connected to the serial ATA bus 15.

The operation of the above-described embodiment will now be described. Assume here that the HDD 10 is connected to the host system 20 that is suitable only for serial ATA interfaces. In this case, the user connects the terminals 181 and 182 of the jumper switch 18 by the jumper line 183 in order to operate the HDD 10 in the serial ATA interface mode. At this time, a switch other than the jumper switch 18 may be used. The user also connects the parallel ATA connector 13 of the HDD 10 to the connector section 171 of the conversion connector 17, thereby connecting the serial ATA connector 21 and power connector 22 of the host system 20 to the connector sections 172 and 173 of the conversion connector 17, respectively.

In this state, power is supplied from the power connector 22 of the host system 20 to the power line 16 in the HDD 10 via the connector section 173 of the conversion connector 17 and the power pins with numbers 40 to 43 in the parallel ATA connector 13. As a result, power is supplied to the various circuits of the HDD 10, such as the parallel ATA interface IC 11, parallel/serial bridge IC 14 and CPU (not shown). When the terminals 181 and 182 of the jumper switch 18 are short-circuited, i.e., when the jumper switch 18 designates the serial ATA interface mode, power is also supplied to the mode-setting circuit 19 via the jumper switch 18. At this time, the mode-setting circuit 19 outputs mode signal 190 of the high level for setting the HDD 10 in the serial ATA interface mode.

Mode signal 190 from the mode-setting circuit 19 is sent to the CPU. The CPU is a main controller for controlling each section of the HDD 10. Upon detection of the output of mode signal 190 of the high level from the mode-setting circuit 19, the CPU recognizes that the HDD 10 is set in the serial ATA interface mode. Mode signal 190 is also sent to the enable terminal EN of the parallel/serial bridge IC 14. While mode signal 190 of the high level is input to the terminal EN, i.e., during the serial ATA interface mode, the parallel/serial bridge IC 14 is operable.

On the other hand, the parallel ATA interface IC 11 operates in the same manner as in the case where the HDD 10 serves as an HDD suitable for parallel ATA interfaces. Accordingly, in a transmission mode, the parallel ATA interface IC 11 sends a parallel ATA interface signal to the parallel ATA bus 12. The signal is then transferred from the parallel ATA bus 12 to the parallel/serial bridge IC 14. The parallel/serial bridge IC 14, in turn, converts the parallel ATA interface signal into a serial ATA interface signal, and sends the serial ATA interface signal to the serial ATA bus 15.

The serial ATA interface signal sent from the parallel/serial bridge IC 14 to the serial ATA bus 15 is sent to the conversion connector 17 via the $26^{th}$ and $30^{th}$ pins of the parallel ATA connector 13. The serial ATA interface signal is then sent to the fifth and sixth pins of the serial ATA connector 21 of the host system 20 via the internal wires W4 and W5 of the conversion connector 17. Thus, the host system 20 receives the serial ATA interface signal.

A description will be given of the case where the host system 20 sends a serial ATA interface signal to the HDD 10. Assume here that a serial ATA interface signal generated in the host system 20 is sent to the serial ATA connector 21. The serial ATA interface signal is sent to the conversion connector 17 via the second and third pins of the connector 21. The serial ATA interface signal sent to the conversion connector 17 is then sent to the $22^{nd}$ and $24^{th}$ pins of the parallel ATA connector 13 via the internal wires W2 and W3 of the connector 17.

The serial ATA interface signal is then transmitted to the parallel/serial bridge IC 14 via the serial ATA bus 15. The parallel/serial bridge IC 14 converts the serial ATA interface signal into a parallel ATA interface signal, and sends it to the parallel ATA bus 12. The parallel ATA interface IC 11 receives the parallel ATA interface signal on the parallel ATA bus 12. Thus, in the embodiment, in the serial interface mode, a serial ATA interface signal can be transmitted between the host system 20 and HDD 10 via several pins (with numbers 22, 24, 26 and 30) included in the particular pins (i.e., the second pins with numbers 2, 19, 22, 24, 26, 30, 40 and 43) of the parallel ATA connector 13 of the HDD 10. The particular pins are not used by the parallel interface, therefore no problem will occur if some of the particular pins are used for inputting and outputting a serial interface signal.

A brief description will be given of the case where the HDD 10 is connected to a host system that is suitable only for parallel ATA interfaces. In this case, the user disconnects the terminals 181 and 182 of the jumper switch 18 from each other, in order to operate the HDD 10 in the parallel ATA interface mode. Further, the user connects the parallel ATA connector 13 of the HDD 10 to the parallel ATA connector of the host system without using the conversion connector 17 as in the prior art.

Where the terminals 181 and 182 of the jumper switch 18 are disconnected, i.e., where the parallel ATA interface mode is designated, the mode-setting circuit 19 outputs mode signal 190 of the low level. In this case, the parallel/serial bridge IC 14 is inoperable. This means that the parallel/serial bridge IC 14 is electrically disconnected from the parallel ATA bus 12 and serial ATA bus 15. In this state, the parallel ATA interface IC 11 communicates with the host system, suitable only for parallel ATA interfaces, via the parallel ATA bus 12 and parallel ATA connector 13 in accordance with the protocol for parallel ATA interfaces.

[First Modification]

Figure 8:
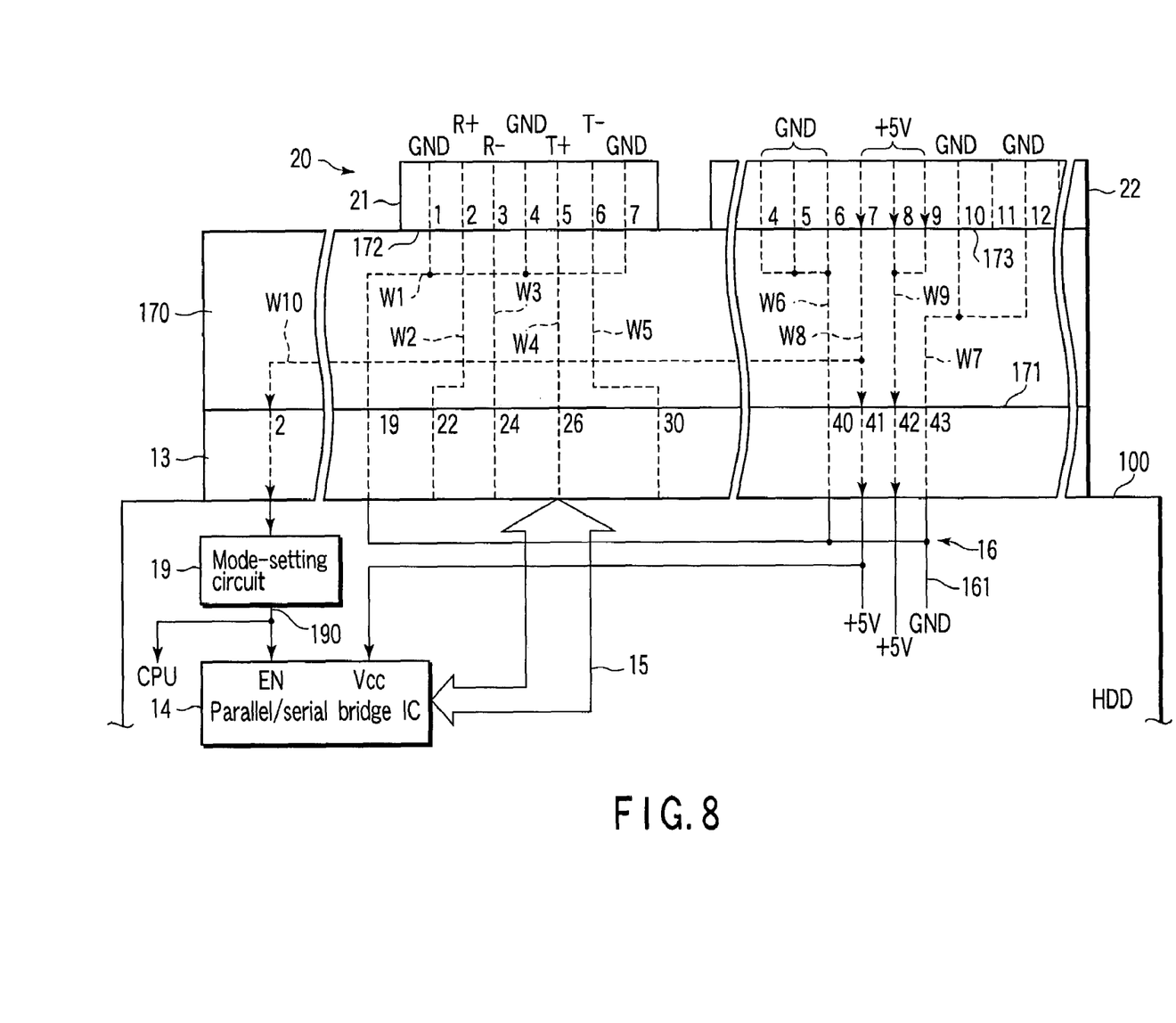
FIG. 8 is a view similar to FIG. 7 and useful in explaining a first modification of the embodiment.

In the above-described embodiment, the user needs to operate the jumper switch 18. A first modification of the embodiment differs from the embodiment in that in the former, the HDD and host system can be connected without the user's operation of the jumper switch 18. Referring to FIG. 8, the first modification will be described. FIG. 8 is a view similar to FIG. 7, illustrating the first modification. In FIGS. 7 and 8, like reference numerals denote like elements. In the first modification, an HDD 100 is used instead of the HDD 10. Further, a conversion connector 170 is used instead of the conversion connector 17. The conversion connector 170 differs from the conversion connector 17 in that in the former, the +5V pin with number 7 in the power connector 22 is also connected to a pin with number 2 (ground pin) in the parallel ATA connector 13 via an internal wire W10 branched from the internal wire W8.

On the other hand, the HDD 100 differs from the HDD 10 in that the former does not have the jumper switch 18. In the HDD 100, the mode-setting circuit 19 is connected to the pin with number 2 in the parallel ATA connector 13, instead of being connected to the terminal 182 of the jumper switch 18.

Assume here that the user connects the HDD 100 to a host system 20 suitable only for serial ATA interfaces. In this case, the user connects the connector section 171 of the conversion connector 170 to the parallel ATA connector 13 of the HDD 100, and connects the connector sections 172 and 173 of the conversion connector 170 to the serial ATA connector 21 and power connector 22 of the host system 20, respectively.

In this state, as in the above-described embodiment, power is supplied to the power line 16 of the HDD 100 from the power connector 22 of the host system 20 via the connector section 173 of the conversion connector 170 and the power pins with numbers 40 to 43 in the parallel ATA connector 13. Simultaneously, +5V is applied to the mode-setting circuit 19 of the HDD 10 via the pin with number 2 (second pin) in the parallel ATA connector 13. In other words, in the first modification, the second pin of the parallel ATA connector 13 is used as a mode-designating device corresponding to the jumper switch 18. When +5V is applied to the mode-setting circuit 19 via the second pin of the parallel ATA connector 13, the circuit 19 outputs mode signal 190 of the high level, with the result that the HDD 100 is operated in the serial ATA interface mode.

On the other hand, assume that the user connects the parallel ATA connector 13 of the HDD 100 to the parallel ATA connector of a host system suitable only for parallel ATA interfaces. In this case, +5V is not applied to the mode-setting circuit 19 via the second pin (ground pin) of the parallel ATA connector 13. In this state, the mode-setting circuit 19 outputs mode signal 190 of the low level. As a result, the HDD 100 is operated in the parallel ATA interface mode.

[Second Modification]

Figure 9:
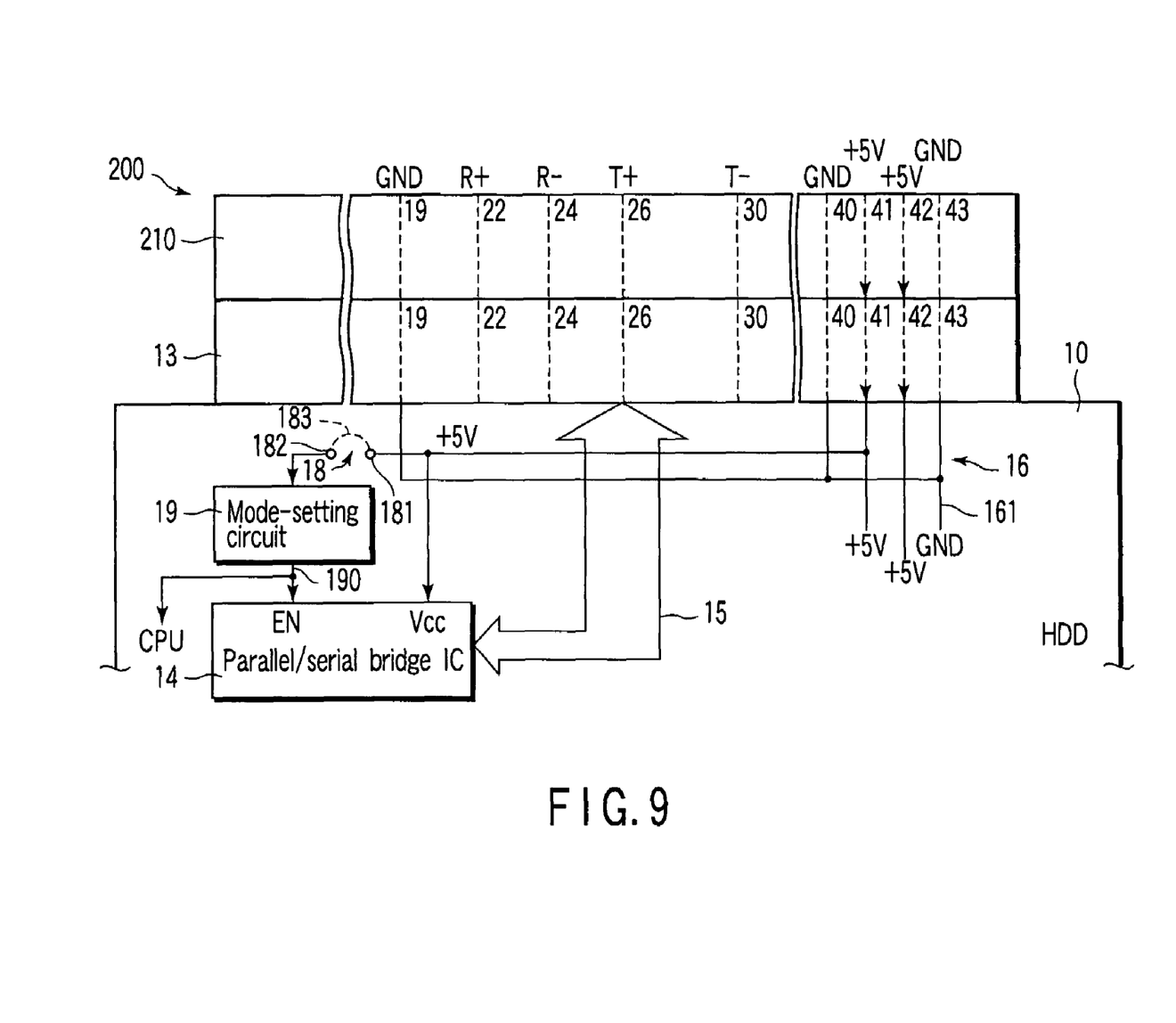
FIG. 9 is a view similar to FIG. 7 and useful in explaining a second modification of the embodiment.

In the above-described embodiment, the user needs to use the conversion connector 17 to connect the HDD 10 to the host system 20 suitable only for serial ATA interfaces. A second modification of the embodiment differs from the embodiment in that in the former, the HDD and host system can be connected without using the conversion connector 17. Referring to FIG. 9, the second modification will be described. FIG. 9 is a view similar to FIG. 7, illustrating the second modification. In FIGS. 7 and 9, like reference numerals denote like elements. In the second modification, a host system 200 is used instead of the host system 20. The host system 200 is characterized in that it is suitable only for serial ATA interfaces like the host system 20, but includes a parallel ATA connector 210 unlike the host system 20. The parallel ATA connector 210 has a function corresponding to that of the serial ATA connector 21 and power connector 22 shown in FIG. 7. The HDD 10 is connected to the host system 200 by connecting the parallel ATA connector 13 of the HDD 10 to the parallel ATA connector 210 of the host system 200.

A pin (ground pin) with number 19 in the parallel ATA connector 210 is assigned as a ground pin for the serial ATA interface. Pins (ground pins) with numbers 22 and 24 in the parallel ATA connector 210 are assigned as pins for transferring serial ATA interface signals R+ and R−, respectively. Further, pins (ground pins) with numbers 26 and 30 in the parallel ATA connector 210 are assigned as pins for transferring serial ATA interface signals T+ and T−, respectively. Pins (ground pins) with numbers 40 and 43 in the parallel ATA connector 210 are assigned as ground pins for the serial ATA interface. In addition, pins (+5V pins) with numbers 41 and 42 in the parallel ATA connector 210 are assigned as +5V pins for the serial ATA interface.

In short, in the example of FIG. 9, the same signals as those assigned to the pins with numbers 19, 22, 24, 26, 30, 40, 41, 42 and 43 in the parallel ATA connector 13 are assigned to the corresponding pins of the parallel ATA connector 210. As described above, the pins with numbers 19, 22, 24, 26, 30, 40, 41, 42 and 43 are not used by the parallel interface. Accordingly, if the parallel ATA connector 13 of the HDD 10 is connected to the parallel ATA connector 210 of the host system 200, a serial ATA interface signal can be directly transmitted between the HDD 10 and host system 200 via the parallel ATA connectors 13 and 210.

As described above, in the second modification of the embodiment, a serial ATA interface signal can be transmitted between the HDD 10 and host system 200 without using a conversion connector, although the host system 200 suitable only for serial ATA interfaces has the parallel ATA connector 210. This is advantageous if, for example, a serial ATA connector cannot be used as the connector of a host system (e.g., a personal computer) because of limitations in manufacturer's packaging technology. The host system 200 can be made to incorporate the function, as employed in the HDD 10, for enabling the host system to be compatible with both parallel and serial ATA interfaces.

In the above-described embodiment and modifications, the present invention is applied to hard disk drives (HDDs). However, the invention is also applicable to systems equipped with other disk drives such as optical disk drives and magneto-optical disk drives. It is sufficient if the disk drives are compatible with both serial and parallel ATA interfaces.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage device with a parallel interface connector connectable to a host system suitable for a parallel interface, the parallel interface connector including first pins connected to a parallel interface bus, and second pins which are not used by the parallel interface, the parallel interface bus being connected to a parallel interface circuit for inputting and outputting a parallel interface signal, the storage device comprising:

a mode designation device which designates one of a serial interface mode and a parallel interface mode, the serial interface mode enabling the storage device to operate in accordance with a serial interface, the parallel interface mode enabling the storage device to operate in accordance with the parallel interface;

a serial interface bus used to transfer a serial interface signal, the serial interface bus being connected to several pins included in the second pins of the parallel interface connector; and a parallel/serial bridge circuit connected to the parallel interface bus and the serial interface bus, and configured to convert, into a serial interface signal, a parallel interface signal transferred via the parallel interface bus, and to output the serial interface signal to the serial interface bus, the parallel/serial bridge circuit being also configured to convert, into a parallel interface signal, a serial interface signal transferred via the serial interface bus, and to output the parallel interface signal to the parallel interface bus, the parallel/serial bridge circuit being operable in the serial interface mode.

2. The storage device according to claim 1, wherein the mode designation device includes a switch which can be operated by a user.

3. The storage device according to claim 2, further comprising a mode-setting circuit which sets the storage device in one of the serial interface mode and the parallel interface mode in accordance with a state of the switch.

4. The storage device according to claim 1, wherein the mode designation device includes a particular second pin included in the second pins of the parallel interface connector and different from the several pins of the second pins, the particular second pin being a pin to which a power supply voltage is applied by a host system suitable for the serial interface, when the storage device is connected to the host system suitable for the serial interface via the parallel interface connector.

5. The storage device according to claim 4, further comprising a mode-setting circuit which sets the storage device in one of the serial interface mode and the parallel interface mode depending upon whether the power supply voltage is applied to the particular second pin of the parallel interface connector.

6. The storage device according to claim 1, further comprising a conversion connector used to connect the parallel interface connector of the storage device to a serial interface connector of a host system suitable for the serial interface, the conversion connector being configured to connect pins of the serial interface connector, which are used to input and output serial interface signals, to the several pins of the second pins of the parallel interface connector.

7. The storage device according to claim 6, wherein:
the parallel interface connector further includes third pins serving as power pins; and
the conversion connector is configured to connect the third pins of the parallel interface connector to power pins of a power connector of the host system suitable for the serial interface.

8. The storage device according to claim 7, wherein:
the mode designation device includes a particular second pin included in the second pins of the parallel interface connector and different from the several pins of the second pins; and
the conversion connector is configured to connect the particular second pin of the parallel interface connector to a particular power pin included in the power pins of the power connector.

9. The storage device according to claim 1, wherein:
the parallel interface connector of the storage device further includes third pins serving as power pins commonly used by the parallel interface and the serial interface;
the parallel interface connector of the storage device is at least connectable to a parallel interface connector of a host system suitable for the serial interface; and
the parallel interface connector of the host system suitable for the serial interface includes pins connectable to the first pins, pins used to transfer serial interface signals and connectable to the second pins, and pins used as power pins for supplying power to the serial interface and connectable to the third pins.

10. A conversion connector to be connected between a parallel interface connector of a storage device suitable for both a parallel interface and a serial interface, and a serial interface connector of a host system suitable for the serial interface, thereby connecting the storage device to the host system, the parallel interface connector of the storage device including first pins connected to a parallel interface bus used to transfer a parallel interface signal, and second pins which are not used by the parallel interface, the storage device being connected to several pins of the second pins, and including a serial interface bus used to transfer a serial interface signal, the conversion connector comprising:
a first connector section connectable to the parallel interface connector of the storage device;
a second connector section connectable to the serial interface connector of the host system; and
internal wires which connect pins of the serial interface connector, which are used to input and output serial interface signals, to the several pins of the second pins of the parallel interface connector, when the first connector section is connected to the parallel interface connector, and the second connector section is connected to the serial interface connector.

11. The conversion connector according to claim 10, further comprising:
a third connector section connectable to a power connector of the host system; and
internal wires which connect a particular pin of the power connector to a particular second pin included in the several pins of the second pins of the parallel interface connector, when the first connector section is connected to the parallel interface connector, the second connector section is connected to the serial interface connector, and the third connector section is connected to the power connector, the particular second pin being used to designate whether the storage device should be operated in a serial interface mode or a parallel interface mode.

* * * * *